(12) United States Patent
Barrilado Gonzalez et al.

(10) Patent No.: US 10,496,471 B2
(45) Date of Patent: Dec. 3, 2019

(54) REGISTER ERROR DETECTION SYSTEM

(71) Applicant: NXP USA, Inc., Austin, TX (US)

(72) Inventors: Andres Barrilado Gonzalez, Toulouse (FR); Ralf Reuter, Landshut (DE); Dominique Delbecq, Fonsorbes (FR); Francesco d'Esposito, Kortenberg (BE); Arnaud Sion, Munich (DE); Gustavo Adolfo Guarin Aristizabal, Munich (DE); Marcel Christoph Welpot, Munich (DE)

(73) Assignee: NXP USA, Inc., Austin, TX (US)

( * ) Notice: Subject to any disclaimer, the term of this patent is extended or adjusted under 35 U.S.C. 154(b) by 183 days.

(21) Appl. No.: 15/705,332

(22) Filed: Sep. 15, 2017

(65) Prior Publication Data

US 2018/0121282 A1 May 3, 2018

(30) Foreign Application Priority Data

Oct. 27, 2016 (EP) .................................... 16306414

(51) Int. Cl.
*G06F 11/10* (2006.01)
*G06F 3/06* (2006.01)
*G06F 11/08* (2006.01)

(52) U.S. Cl.
CPC .......... *G06F 11/1004* (2013.01); *G06F 3/064* (2013.01); *G06F 3/0619* (2013.01);
(Continued)

(58) Field of Classification Search
CPC ...... G06F 11/1004; G06F 11/08; G06F 11/10; G06F 11/1012; G06F 11/102;
(Continued)

(56) References Cited

U.S. PATENT DOCUMENTS 6,467,060 B1 * 10/2002 Malakapalli ........... G11B 20/18
714/758
7,596,744 B1    9/2009 Kow et al.
(Continued)

OTHER PUBLICATIONS

Nicolaidis, Michael, "Design Techniques for Soft-error Mitigation," 2010 IEEE International Conference on IC Design and Technology (ICICDT), 7 pages.

*Primary Examiner* — Cynthia Britt

(57) ABSTRACT

A system for register error detection is described, the system comprising: a plurality of addressable registers comprising sets of registers, the registers in each set having contiguous addresses; a cyclic redundancy check generator coupled to the addressable registers and configured to determine a cyclic-redundancy-check result for each set of registers from the values of each of the respective set of registers; a controller coupled to the registers and the cyclic-redundancy-check generator. The controller comprises a cyclic-redundancy-check calculator and is configured to determine an expected cyclic-redundancy-check result from expected values for each of the set of registers, to read the cyclic-redundancy-check result for each of the set of registers determined by the cyclic-redundancy-check generator, and to compare the generated cyclic-redundancy-check result with the calculated cyclic-redundancy-check result and wherein a difference between the generated cyclic-redundancy-check result and the calculated cyclic-redundancy-check result is indicative of an error condition.

15 Claims, 6 Drawing Sheets

(52) U.S. Cl.
CPC ............ *G06F 3/0683* (2013.01); *G06F 11/08* (2013.01); *G06F 11/10* (2013.01)

(58) Field of Classification Search
CPC .... G06F 11/1048; G06F 3/0683; G06F 3/064; G06F 3/0619
See application file for complete search history.

(56) References Cited

U.S. PATENT DOCUMENTS

| | | | |
|---|---|---|---|
| 2008/0183928 A1* | 7/2008 | Devila | G06F 13/4291 710/110 |
| 2009/0183051 A1* | 7/2009 | Balb | G06F 11/1004 714/758 |
| 2011/0047439 A1* | 2/2011 | Jorda | G06F 11/1048 714/763 |
| 2014/0026021 A1 | 1/2014 | Hill et al. | |
| 2014/0089755 A1* | 3/2014 | Kantamsetti | G06F 11/1048 714/748 |
| 2015/0199233 A1 | 7/2015 | Pelley et al. | |
| 2016/0117217 A1 | 4/2016 | Anand et al. | |
| 2016/0266836 A1 | 9/2016 | Tran et al. | |
| 2017/0060673 A1* | 3/2017 | Bowman | G06F 11/1056 |

* cited by examiner

REGISTER ERROR DETECTION SYSTEM

This disclosure relates to a system for error detection, the system comprising addressable registers.

Many systems controlled by a microprocessor, microcontroller or other programmable device have a number of addressable registers, which are may be accessed from the microcontroller according to a predefined memory map. These addressable registers may be included on the same device as the microcontroller. Alternatively, in many systems these addressable registers may be on a separate device which is controlled by a microcontroller via a communication bus between the two devices. In automotive applications, a number of Application-Specific Integrated Circuits (ASIC) may have dedicated functions such as airbag monitoring and control, brake monitoring and control, and radar chirp signal generation. One or more of these ASICs may be connected to a microcontroller or other programmable device via a communication bus such as a Controller Area Network (CAN) bus or Local Interconnect Network (LIN) bus. Each of these ASICs contain an addressable register space which may be configured for example during the execution of an application-related program on the microcontroller.

The values stored in these addressable registers may be corrupted in operation. These so-called soft errors may be due to alpha particles or other sources of radiation which generate high-energy particles that interact with the semiconductor device. The result of the soft-error may be that the system fails to operate correctly which is not acceptable particularly in safety-critical applications such as automotive control systems. Soft errors may conventionally be detected and correcting by implementing registers as self-checking ECC (Error Corrected Code) memories. ECC memories require additional circuitry to generate the check codes and detection logic and additional storage for the check codes which requires significant additional area.

Various aspects of the disclosure are defined in the accompanying claims. In a first aspect there is defined a system for register error detection comprising: a plurality of addressable registers comprising sets of registers, the registers in each set having contiguous addresses; a cyclic redundancy check generator coupled to the addressable registers and configured to determine a cyclic-redundancy-check result for each set of registers from the values of each of the respective set of registers; a controller coupled to the registers and the cyclic-redundancy-check generator; wherein the controller comprises a cyclic-redundancy-check calculator and is configured to determine an expected cyclic-redundancy-check result from expected values for each of the set of registers, to read the cyclic-redundancy-check result for each of the set of registers determined by the cyclic-redundancy-check generator, and to compare the generated cyclic-redundancy-check result with the calculated cyclic-redundancy-check result and wherein a difference between the generated cyclic-redundancy-check result and the calculated cyclic-redundancy-check result is indicative of an error condition.

In one or more embodiments, the system may comprise a first device and a second device, wherein the first device comprises the plurality of addressable registers and the cyclic-redundancy-check generator and the second device comprises the controller.

In one or more embodiments, the first device may comprise one of a radar front-end device, an airbag control device and a vehicle braking system control device.

In one or more embodiments, the controller may comprise a microcontroller.

In one or more embodiments, the cyclic-redundancy-check generator may be further configured to use the cyclic-redundancy-check result as a seed value for a subsequent cyclic-redundancy-check generation, the cyclic-redundancy-check calculator may be configured to use the calculated cyclic-redundancy-check result as a seed value for a subsequent further cyclic-redundancy-check calculation and wherein the cyclic-redundancy-check generator and the cyclic-redundancy-check calculator may be configured to generate a cumulative generated cyclic-redundancy-check result and a cumulative calculated cyclic-redundancy-check result and wherein a difference between the cumulative generated cyclic-redundancy-check result and the cumulative calculated cyclic-redundancy-check result is indicative of an error condition.

In one or more embodiments the sets of registers may comprise a set of registers which have values determined by the controller during operation.

In one or more embodiments the sets of registers may comprise at least one set of registers which have values determined by a further circuit.

In one or more embodiments the sets of registers may comprise a set of registers which each have a constant value following an initialization phase.

In one or more embodiments the sets of registers may comprise a set of configuration registers, a set of dynamic control registers, a set of status registers, and a set of protected registers.

In one or more embodiments the cyclic-redundancy-check generation for at least one of the register sets may be triggered by further circuitry in the second device.

In a second aspect there is describes a method for register error detection in a system comprising sets of memory-mapped registers, each set having contiguous addresses, the method comprising generating a cyclic-redundancy-check result for each set of registers from the register values, comparing the generated cyclic-redundancy-check result with a calculated cyclic-redundancy-check result from the expected register values and wherein a difference between the generated cyclic-redundancy-check result and the calculated cyclic-redundancy-check result is indicative of an error condition.

In one or more embodiments determining the cyclic-redundancy-check result may be determined in a first device comprising a first cyclic-redundancy-check calculator and the plurality of addressable registers and determining the second cyclic-redundancy-check result may be determined in a second device comprising a second cyclic-redundancy-check calculator, wherein the second device determines at least some of the register values of the plurality of addressable registers.

In one or more embodiments the method may further comprising generating a cumulative generated cyclic-redundancy-check result using the generated cyclic-redundancy-check result as a seed for a subsequent cyclic-redundancy-check generation, generating a cumulative calculated cyclic-redundancy-check result using the calculated cyclic-redundancy-check result as a seed for a subsequent cyclic-redundancy-check calculation, comparing the cumulative generated cyclic-redundancy-check result and the cumulative calculated cyclic-redundancy-check result, and wherein a difference between the cumulative cyclic-redundancy-check result and the expected cumulative cyclic-redundancy-check result is indicative of an error condition.

In one or more embodiments the cyclic-redundancy-check generation for at least one of the register set is hardware-triggered.

In one or more embodiments of the method, the sets of registers comprise at least one of a set of registers whose values remain constant following an initialization phase and a set of registers whose values change during operation.

In a third aspect there is described a computer program product comprising instructions which, when being executed by a processing unit in a system comprising sets of memory-mapped registers, each set having contiguous addresses, cause said processing unit to perform the steps of, generating a cyclic-redundancy-check result for each set of registers from the register values, comparing the generated cyclic-redundancy-check result with a calculated cyclic-redundancy-check result from the expected register values and wherein a difference between the generated cyclic-redundancy-check result and the calculated cyclic-redundancy-check result is indicative of an error condition.

In the figures and description like reference numerals refer to like features. Embodiments of the invention are now described in detail, by way of example only, illustrated by the accompanying drawings in which:

FIG. 3b shows an example cyclic-redundancy-check generator used in the system of FIG. 3a.

DESCRIPTION

Figure 1A:
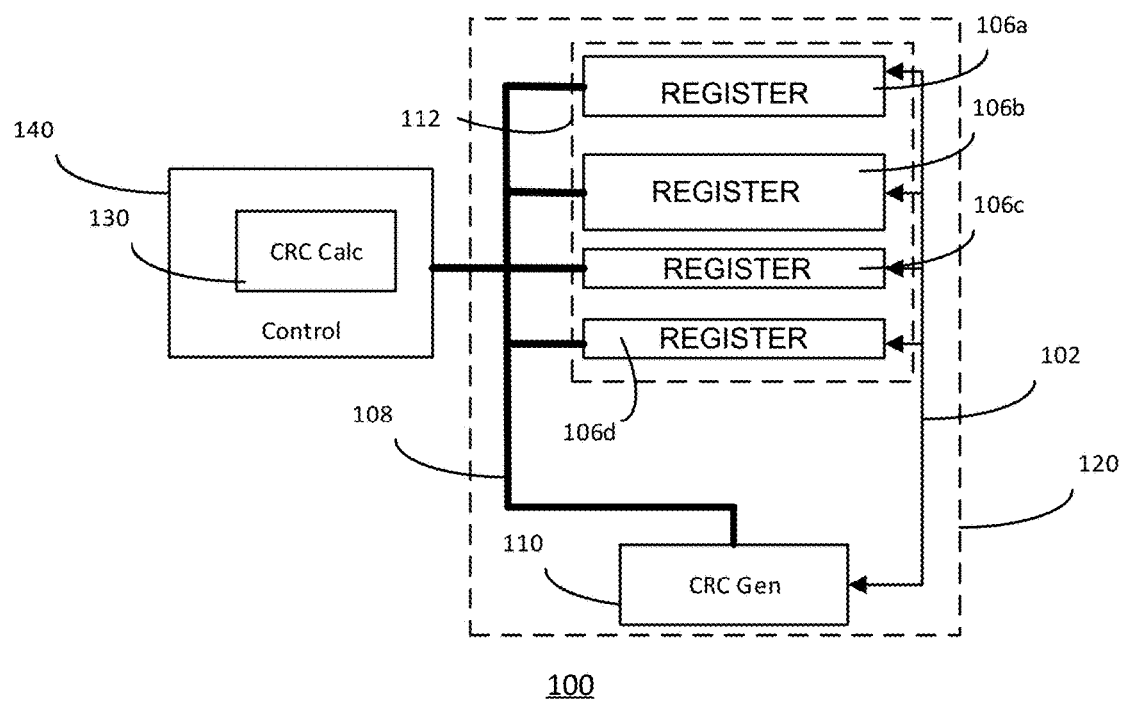
FIG. 1a shows a system for error detection according to an embodiment.

FIG. 1a shows a system for register error detection 100 including a controller 140 connected to an ASIC 120. A register bank 112 contains a number of addressable registers 106a, 106b, 106c, and 106d. Each of the groups of registers 106a-d may be connected to a communication bus 108. Although a single communication bus 108 is shown, the skilled person will appreciate that the communication bus 108 may have a number of different protocols depending on whether the communication is on-chip or off-chip. For example, an off-chip bus may be a CAN or LIN bus. An on-chip bus may for example be an AMBA® bus. Various bus adapters (not shown) may be used to translate between the different bus protocols. A cyclic-redundancy-check (CRC) generator 110 may be connected to the communication bus 108. The CRC generator 110 may also be connected via CRC control connection 102 to one or more addressable registers. The CRC control connection 102 may be a single connection or multiple wires.

The controller 140 may include a CRC calculation module 130 connected to the communication bus 108. The registers may typically be implemented in hardware using flip-flops, or latches which are not periodically refreshed as is the case with DRAM memory cells. The CRC generator 110 may be typically implemented as a linear feedback shift register with associated logic to read register values via the communication bus which are then used to generate the CRC code. The controller 140 may be implemented in hardware or a combination of hardware and software running on a microprocessor as a separate integrated circuit to the ASIC 120. CRC calculation module 130 may be implemented in hardware, or software running on a microprocessor or microcontroller.

Figure 1B:
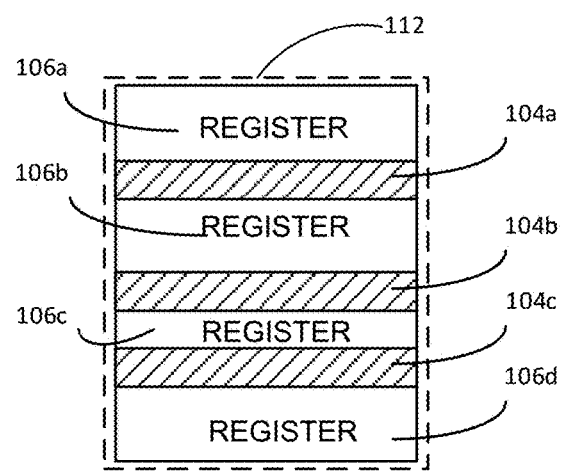
FIG. 1b shows register bank in the system of FIG. 1a as organized in memory mapped I/O address space.

FIG. 1b shows register bank 112 as organized in memory mapped I/O address space. Groups or sets of registers 106a, 106b, 106c, and 106d are arranged in memory mapped I/O address space in a range of contiguous addresses. The contiguous address ranges for the groups of registers 106a-d may be separated by address ranges for which there are no corresponding registers, shown as areas 104a, 104b, and 104c respectively. Registers are grouped into respective register sets or memory zones according to how often the register values are expected to change in operation.

For example, a first set of registers 106a may only be accessed (i.e. written to and/or read from) once during an application. The first set of registers 106a may include for example general configuration registers which determine properties such as pin configurations, trim settings for certain functions such as amplifiers, A/D converters, bandgap reference level (not shown) and which are set during initialization and not expected to change during the application.

A second set of registers 106b may be accessed continuously during the application by the controller 140 in order to perform certain application-related actions. For example, in a car radar system, these application-related actions may include channel selections or a trigger event such as a change in the radar chirp profile.

A third set of registers 106c may be registers that are updated by the device 120 itself based on the operation of other circuitry which may be referred to as status registers. For example, this may include results from analog-to-digital conversion of a signal received from a brake sensor, radar, airbag sensor.

A fourth set of registers 106d may include registers that are not visible to the application. These may for example be factory-only registers that are used for trim or test purposes but not advertised, documented or accessible in normal operation and may be referred to as protected registers.

In operation of the system for error detection 100, the CRC generator 110 may have read access to the registers in the register bank 112. The algorithm and the size of the polynomial implemented by the CRC generator 110 may be determined according to the number of registers in each of the memory zones 106a-d. The controller 140 may have read/write access to the register bank 112 and may for example access registers in one or all of the memory zones 106a-d to set up various operating modes of the system 100. The controller 140 may keep a local copy of an expected value for the registers in the memory zones 106a-d in a local memory (not shown).

The CRC generator 110 may generate a CRC for each of the memory zones 106a-d from the values of the registers in each of the respective memory zones. The controller 140 may read the CRC results from the CRC generator 110 and compare the CRC results with the expected CRC values determined by CRC calculation module 130 from the expected register values of each of the memory zones 106a-d.

For systems which have a controller 140 implemented in a separate device to an ASIC 120, the controller 140 may have access to a relatively large amount of memory which can be used to store expected values of registers. The controller 140 may then independently determine a CRC for those registers using CRC calculation module 130. Furthermore, by dividing the registers into different memory zones according to how frequently they are accessed or change, a single CRC can be time multiplexed between the different memory zones 106a-d. Consequently, the size of the CRC generator 110 may be reduced since the maximum number of registers accessed by the CRC generator 110 is reduced.

As the controller 140 and the ASIC 120 are separate integrated circuits, this may reduce the probability that a single event disturbs the values of both the controller 140 and the device 120 which may make the CRC check more reliable. However, it will be appreciated that in other examples the controller 140 and the circuitry in the ASIC 120 may be implemented in a single integrated circuit or as separate die in a multi-chip module.

Figure 2A:
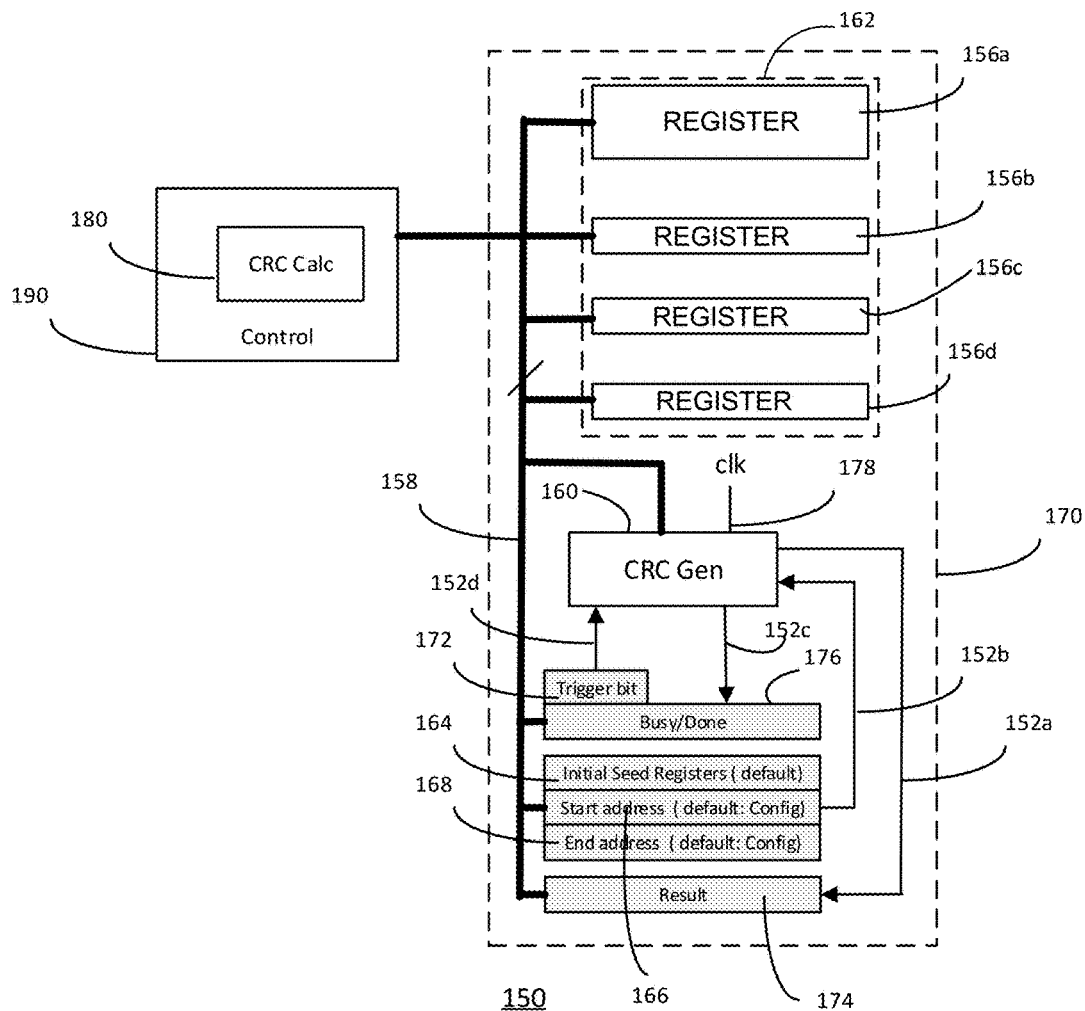
FIG. 2a illustrates a system for error detection according to an embodiment.

FIG. 2a shows a system for register error detection 150 including a controller 190 connected to an ASIC 170. A register bank 162 contains a number of sets of addressable registers 156a, 156b, 156c, and 156d. Each of the groups of registers 156a-d may be connected to a communication bus 158. A cyclic-redundancy-check (CRC) generator 160 may be connected to the communication bus 158. The CRC generator 160 may have a result output 152a connected to a result register 174. The CRC generator 160 may have a clock input 178. The CRC generator 160 may have a configuration input 152b connected to an initial seed register 164, a start address register 166 and an end address register 168. It will be appreciated that the configuration input may 152b include multiple wires for separate connections to the initial seed register 164, the start address register 166 and the end address register 168. The CRC generator 160 may have a status output 152c connected to a status register 176. The status output 152c indicates when the CRC generator is calculating a CRC (busy) or has generated a CRC (done). The CRC generator 160 may have a trigger input 152d connected to a trigger register 172.

The trigger register 172, the status register 176, the initial seed register 164, the start address register 166, the end address register 168 and the result register 174 may all be connected to the communication bus 158.

The controller 190 may include a CRC calculation module 180 connected to the communication bus 158. The registers 156a-d may typically be implemented in hardware using flip-flops, or latches which are not periodically refreshed as is the case with DRAM memory cells. The CRC generator 160 may be implemented as a linear feedback shift register with associated logic to read register values via the communication bus which are then used to generate the CRC code. The controller 190 may be implemented in hardware or a combination of hardware and software running on a microprocessor as a separate integrated circuit to the ASIC 170. CRC calculation module 180 may be implemented in hardware, or software running on a microprocessor or microcontroller.

Figure 2B:
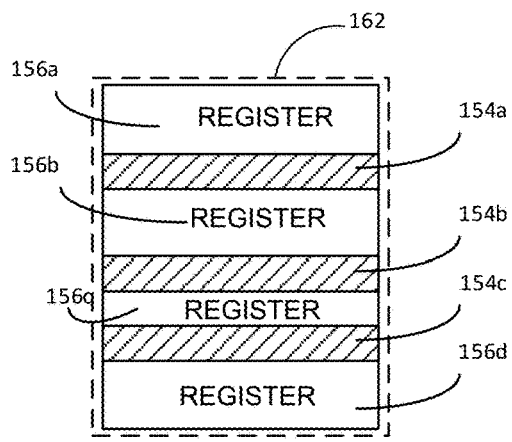
FIG. 2b shows register bank in the system of FIG. 1a as organized in memory mapped I/O address space.

FIG. 2b shows register bank 162 as organized in memory mapped I/O address space. Groups or sets of registers 156a, 156b, 156c, and 156d are arranged in memory mapped I/O address space in a range of contiguous addresses. The contiguous address ranges for the groups of registers 156a-d may be separated by address ranges for which there are no corresponding registers, shown as areas 154a, 154b, and 154c respectively. Registers may be grouped into respective memory zones according to how often the register values are expected to change in operation. FIG. 2b illustrates grouping into four memory zones. In other examples, registers may be grouped into fewer or more memory zones.

For example, a first set of registers 156a may only be accessed (i.e. written to and/or read from) once during an application. A second set of registers 156b may be accessed continuously during the application by the controller 140 in order to perform certain application-related actions. A third set of registers 156c may be registers that are updated by the ASIC 170 itself based on the operation of other circuitry which may be referred to as status registers. For example this may include results from analog-to-digital conversion of a signal received from a brake sensor, radar, airbag sensor. A fourth set of registers 156d may include registers that are not visible to the application. These may for example be factory-only registers that are used for trim or test purposes but not advertised, documented or accessible in normal operation and may be referred to as protected registers.

In operation of the system for error detection 150, the CRC generator 160 may have read access to the registers in the register bank 162. The algorithm and the size of the polynomial implemented by the CRC generator 160 may be determined according to the number of registers in each of the memory zones 106a-d. For example, the CRC generator 160 may be a CRC16 generator. The controller 190 may have read/write access to the register bank 162 and may for example access registers one or all of the memory zones 156a-d to set up various operating modes of the system 150. The controller 190 may keep a local copy of an expected value for the registers in the memory zones 156a-d in a local memory (not shown).

The CRC generator 160 may generate a CRC for each of the memory zones 106a-d from the values of the registers in each of the respective memory zones. The controller may determine which of the memory zones is accessed by the CRC generator 160 by writing a start and end address to the start address register 166 and the end address register 168 respectively. The controller 190 may also write a seed value for the CRC generation to the initial seed register 164. The controller 190 may trigger the CRC cycle by writing to the trigger register 172. The controller 190 may determine when the CRC generation cycle is complete by polling the status register which may also be referred to as the busy/done register 176. Once the CRC generation cycle is complete, the controller 190 may read the CRC results from the result register 174 and compare the CRC results with the expected CRC values determined by CRC calculation module 180 from the expected register values of the respective one of the memory zones 156a-d for which the CRC value has been generated.

For systems which have a controller 190, which may be a microcontroller implemented in a separate device to an ASIC 170, the controller 190 may have access to a relatively large amount of memory which can be used to store expected values of registers. The controller 190 may then independently determine a CRC for those registers using CRC calculation module 180. Furthermore, by dividing the registers into different memory zones according to how frequently they are accessed or change, the single CRC generator 160 can be time multiplexed between the different memory zones 156a-d. Consequently, the size of the CRC generator 160 may be reduced since the maximum number of registers accessed by the CRC generator 160 is reduced.

In addition, by having programmable registers for initial seed value 164, start address 166 and end address 168, the memory zones for the CRC calculation may be dynamically altered.

As the controller 190 and the ASIC 170 are separate integrated circuits, this may reduce the probability that a single event disturbs the values of both the controller 190 and the device 170 which may make the CRC check more reliable. However, it will be appreciated that in other examples the controller 190 and the circuitry in the ASIC 170 may be implemented in a single integrated circuit or as separate die in a multi-chip module.

Figure 3A:
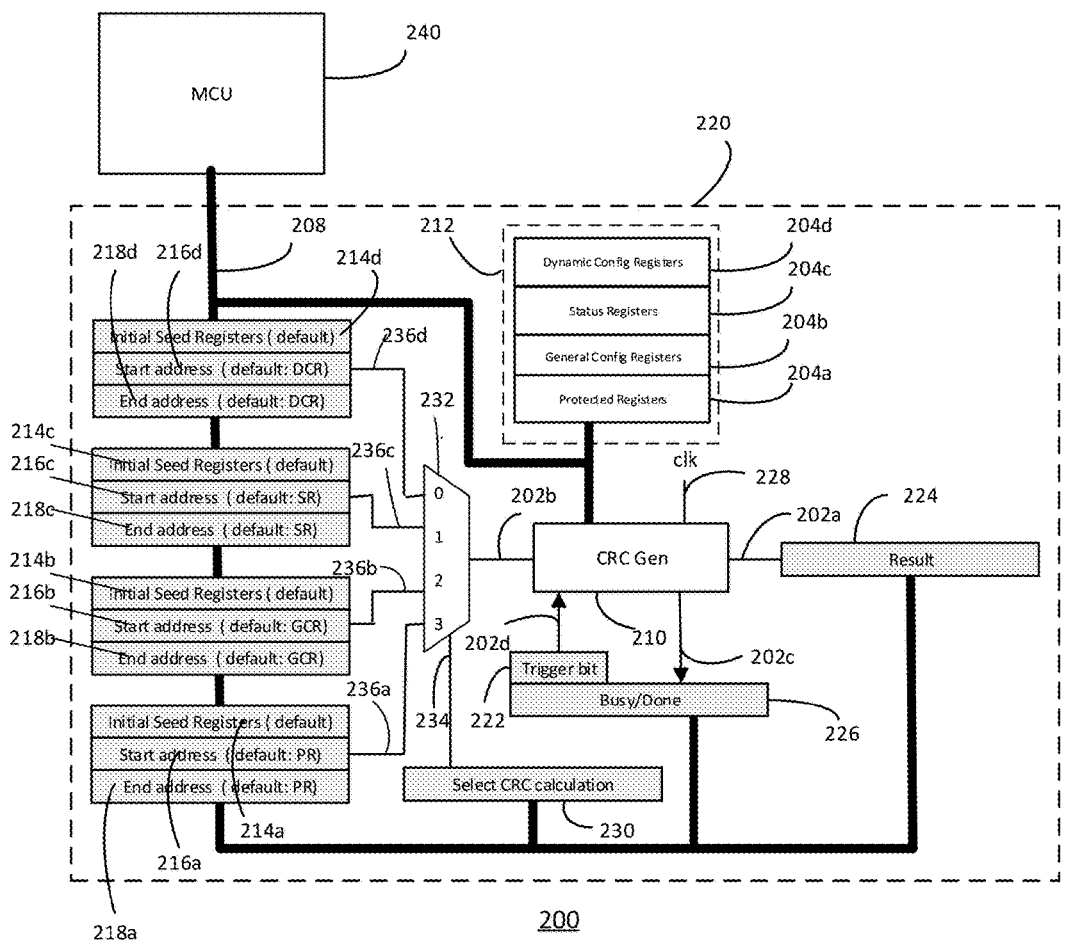
FIG. 3a shows a system for error detection according to an embodiment.

FIG. 3A shows a system for register error correction 200 including a micro-controller 240 connected to an ASIC 220. A register bank 212 contains a number of sets of addressable registers 204a, 204b, 204cc, and 204d. Each of the groups of registers 204a-d may be connected to a communication bus 208. A cyclic-redundancy-check generator 210 may be connected to the communication bus 208. Each of the groups or sets of registers 204a-d may have contiguous addresses. Registers may be grouped into a set according to how often they are expected to be accessed by an application. A set of general config registers 204b may only be accessed (i.e. written to and/or read from) once during an application. A set of dynamic configuration registers 204d may be accessed continuously during the application by the microcontroller 240 in order to perform certain application-related actions. A set of status registers 204c may be registers that are updated by the ASIC 220 itself based on the operation of other circuitry. For example, this may include results from analog-to-digital conversion of a signal received from a brake sensor, radar, airbag sensor. A set of protected registers 204a may include registers that are not visible to the application. These may for example be factory-only registers that are used for trim or test purposes but not advertised, documented or accessible in normal operation and may be referred to as protected registers.

The CRC generator 210 may have a result output 202a connected to a result register 224. The CRC generator 210 may have a clock input 228.

The CRC generator 210 may have a configuration input 202b connected to an output of a multiplexer 232. The multiplexer may have four inputs 236a, 236b, 236c, and 236d. Each of the inputs 236a-d may be connected to a respective initial seed register 214a-d, start address register 216a-d and end address register 218a-d.

It will be appreciated that the multiplexer inputs 236a-d may include multiple wires for separate connections to the respective initial seed register 214a-d, start address register 216a-d and end address register 218a-d. The multiplexer control input 234 may be connected to a CRC select register 230.

The CRC generator 210 may have a status output 202c connected to a status register 226. The status output 202c may indicate when the CRC generator is calculating a CRC (busy) or has generated a CRC (done). The CRC generator 210 may have a trigger input 202d connected to a trigger register 222.

The trigger register 222, the status register 226, the initial seed registers 214a-d, the start address registers 216a-d, the end address registers 218a-d, the result register 224, and the CRC select register 230 may all be connected to the communication bus 208.

The microcontroller 240 may be connected to the communication bus 208.

The registers in register bank 212 may typically be implemented in hardware using flip-flops, or latches which are not periodically refreshed as is the case with DRAM memory cells. The CRC generator 210 may be implemented as a linear feedback shift register driven by a clock signal with associated logic to read register values via the communication bus which are then used to generate the CRC code. The microcontroller 240 has a combination of hardware and software included in memory (not shown) in a separate integrated circuit to the ASIC 220. CRC calculation module 230 may be implemented in hardware, or software running on a microprocessor or microcontroller.

In operation of the system 200, the CRC generator 210 may have read access to the registers in the register bank 212. The algorithm and the size of the polynomial implemented by the CRC generator 210 may be determined according to the number of registers in each of the group's 204a-d. For example, the CRC generator 210 may be a CRC16 generator. The microcontroller 240 may have read/write access to the register bank 162 and may for example access registers one or all of the register sets 204a-d to set up various operating modes of the system 200. The microcontroller 240 may keep a local copy of an expected value for the registers in the memory zones 156a-d in a local memory (not shown).

The CRC generator 210 may generate a CRC for each of the register sets 106a-d from the values of the registers in the respective register set. The microcontroller 240 may determine which of the register sets 204a-d is accessed by the CRC generator 210 by control of the multiplexer 232 by writing a value into the selection register 230.

The microcontroller 240 may write a start and end address to each of the respective the start address registers 216a-d and the end address register 218a-d respectively corresponding to the register sets 204a-d. The microcontroller 240 may also write a seed value for the CRC generation to each of the respective initial seed registers 214a-d. The microcontroller 240 may trigger the CRC cycle by writing to the trigger register 222. The controller 240 may determine when the CRC generation cycle is complete by polling the status register 226 which may also be referred to as the busy/done register. Once the CRC generation cycle is complete, the microcontroller 240 may read the CRC results from the result register 224 and compare the CRC results with the expected CRC values determined by CRC calculation module (not shown) implemented in software running on the microcontroller 240 from the expected register values of the respective one of the memory zones 204a-d for which the CRC value has been generated.

By dividing the registers into different memory zones according to how frequently they are accessed or change, the single CRC generator 210 can be time multiplexed between the different memory zones 204a-d. Consequently, the size of the CRC generator 210 may be reduced since the maximum number of registers accessed by the CRC generator 210 is reduced. In addition, by having programmable registers for initial seed value 214a-d, start address 216a-d and end address 218a-d, the memory zones for the CRC calculation may be altered during initial configuration and then do not need to be accessed during the application.

As the microcontroller 240 and the ASIC 220 are separate integrated circuits, this may reduce the probability that a single event disturbs the values of both the microcontroller 240 and the ASIC 220 which may make the CRC check more reliable.

In other examples, the microcontroller 240 may be omitted and replaced by a controller implemented in logic hardware for example on a FPGA. In other examples the microcontroller 240 may be omitted and replaced by a General-Purpose Processor Unit (GPU).

Figure 3B:
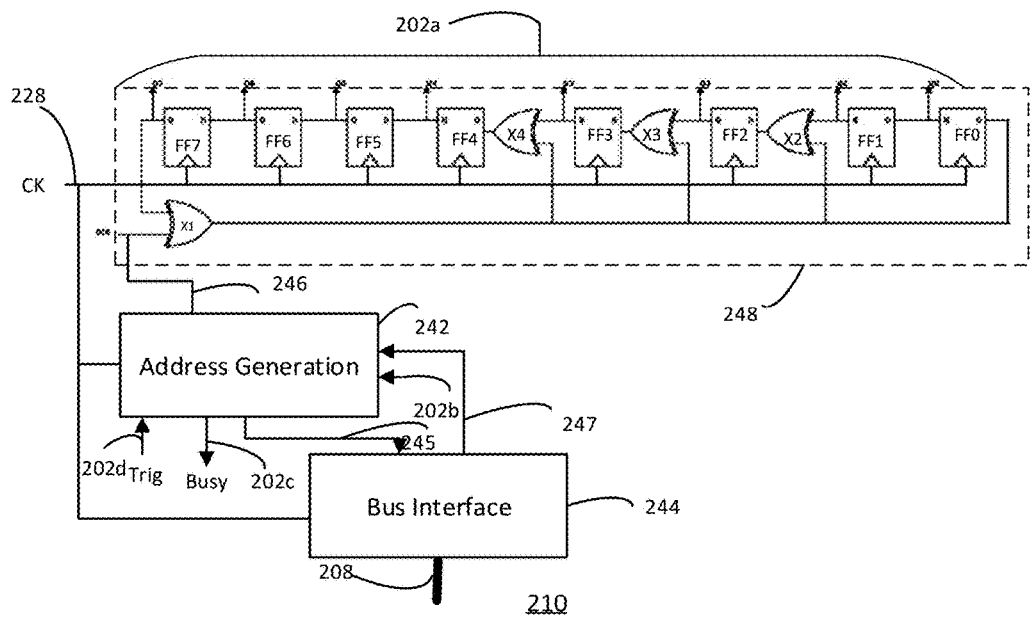

FIG. 3B shows further detail of the CRC generator 210. A CRC implemented as a linear feedback shift register (LFSR) 248 may consist of a series arrangement of 8 flip-flops FF0 to FF8. A first exclusive OR gate X1 may be arranged between the output of flip-flop FF7 and FF0. A second exclusive OR gate X1 may be arranged between flip-flops FF1 and FF2. A third exclusive-OR gate X3 may be arranged between flip-flops FF2 and FF2. A fourth exclusive-OR gate X4 may be arranged between flip-flops FF3 and FF4.

The output of the first exclusive-OR gate X1 may be connected to one of the inputs of exclusive-OR gates X2, X3 and X4. A data input 246 to the first exclusive OR gate X1 may be connected to an address generator 242.

An address output 245 from the address generator 242 may be connected to a bus interface 244. A read data output 247 from the bus interface 244 may be connected to the address generator 242. The bus interface 244 may be connected to the communication bus 208. The clock connection 228 may be connected to each of the flip-flops FF0 to FF8, the address generator 242 and the bus interface 244.

The address generator 242 may be connected to the output 202*b* of the multiplexer 232. The address generator 242 may have an enable input connected to the trigger output 202*d*. The address generator 242 may have a busy status output 202*c*.

When enabled, the address generator 242 may assert the busy output 202*c*. The address generator 242 may provide the initial seed value from the selected one of seed registers 214*a-d* to the LFSR 248 via the data input 246. The address generator may then generate addresses in the address range determined by the selected one of start address registers 216*a-d* and end address registers 218*a-d*.

The generated address may be provided to the communication bus 208 via the bus interface 244. The data read back from the corresponding addressable register may be provided to the address generator on read data output 247. The address generator 242 may serialize the data and provide it to the LFSR 248 on data input 246. Once registers at all addresses in the range have been read, the resulting signature on outputs Q0 to Q8 which may be connected 202*a* to the result register 224, may be latched by the result register 224. The busy output 202*c* may be de-asserted by address generator 242 to indicate that the CRC check is completed.

It will be appreciated that in other examples other typical CRC methods and circuits may be used adapted to the register topology of the addressable registers. For example, if the addressable registers are organized in 16-bit registers, a 16-bit CRC may be used.

Figure 4:
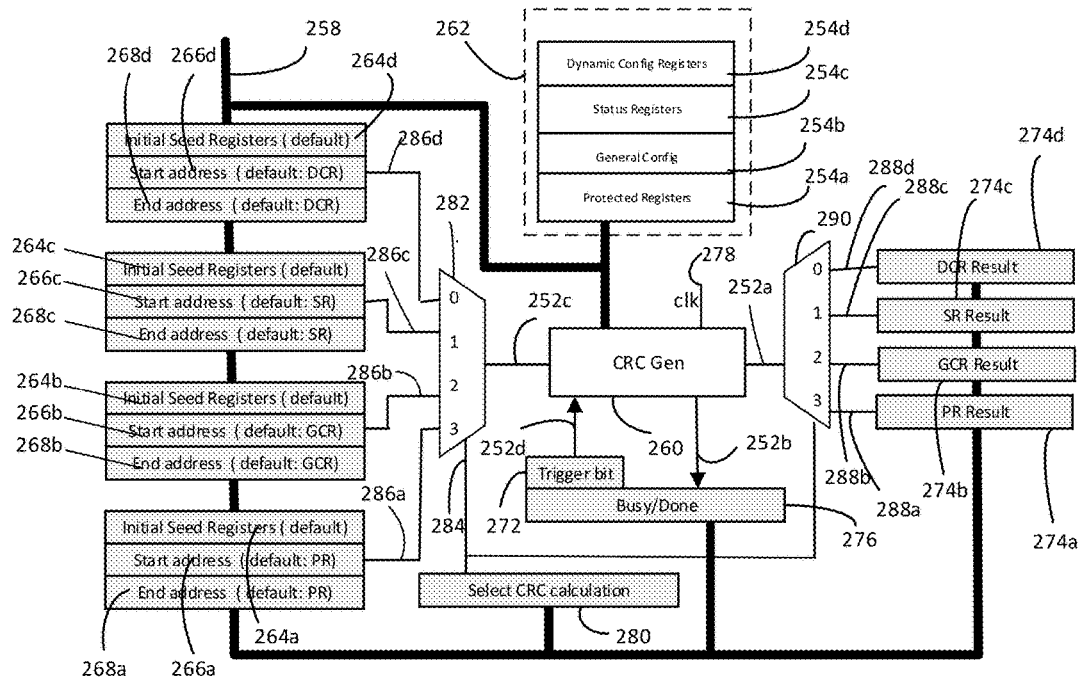
FIG. 4 illustrates a system for error detection according to an embodiment.

FIG. 4 shows a device 250. A register bank 262 contains a number of sets of addressable registers 254*a*, 254*b*, 254*c*, and 254*d*. Each of the groups of registers 254*a-d* may be connected to a communication bus 258. A CRC generator 260 may be connected to the communication bus 258. Each of the groups of registers 204*a-d* may have contiguous addresses. Registers are grouped according to how often they are expected to be accessed by an application. A set of general config registers 254*b* may only be accessed (i.e. written to and/or read from) once during an application. A set of dynamic configuration registers 254*d* may be accessed continuously during the application by a microcontroller (not shown) connected to the device 250 by the communication bus 258 in order to perform certain application-related actions. A set of status registers 204*c* may be registers that are updated by the device 250 itself based on the operation of other circuitry. For example, this may include results from analog-to-digital conversion of a signal received from a brake sensor, radar, airbag sensor. A set of protected registers 254*a* may include registers that are not visible to the application. These may for example be factory-only registers that are used for trim or test purposes but not advertised, documented or accessible in normal operation.

The CRC generator 260 may have a result output 252*a* connected to a result multiplexer 290. The result multiplexer may have four outputs 288*a*, 288*b*, 288*c*, 288*d* connected to a corresponding addressable result register 274*a*, 274*b*, 274*c*, and 274*d*. The result registers 274*a-d* may be connected to the communication bus 258. The CRC generator 260 may have a clock input 278.

The CRC generator 260 may have a configuration input 252*b* connected to an output of the address multiplexer 282. The address multiplexer 282 may have four inputs 286*a*, 286*b*, 286*c*, and 286*d*. Each of the inputs 286*a-d* is connected to a respective initial seed register 264*a-d*, start address register 266*a-d* and end address register 268*a-d*.

It will be appreciated that the address multiplexer inputs 286*a-d* may include multiple wires for separate connections to the respective initial seed register 264*a-d*, start address register 266*a-d* and end address register 268*a-d*. The address multiplexer control input may be connected to a control output 284 of the CRC select register 280. The control input of result multiplexer 290 may be connected to the CRC select register.

The CRC generator 260 may have a status output 252*c* connected to a status register 276. The status output 252*c* indicates when the CRC generator is calculating a CRC (busy) or has generated a CRC (done). The CRC generator 260 may have a trigger input 252*d* connected to a trigger register 272.

The trigger register 272, the status register 276, the initial seed registers 264*a-d*, the start address register 266*a-d*, the end address register 268*a-d*, the result registers 274*a-d*, and the CRC select register 280 may all be connected to the communication bus 258.

In operation of the device 250, the CRC generator 260 may have read access to the registers in the register bank 262. A microcontroller (not shown) connected to the device 250 via the communication bus 258 may have read/write access to the register bank 262 and may for example access registers one or all of the register sets 254*a-d* to set up various operating modes of the device 250. The microcontroller may keep a local copy of an expected value for the registers in the memory zones 254*a-d* in a local memory (not shown).

The CRC generator 260 may generate a CRC for each of the register sets 254*a-d* from the values of the registers in the respective register set. A microcontroller may determine which of the register sets 254*a-d* is accessed by the CRC generator 260 by control of the multiplexer 282 by writing a value into the selection register 280. The microcontroller may determine which of the result registers 274*a-d* are used to store the CRC result by controlling the result register multiplexer 290 by writing a value into the selection register 280.

The microcontroller may write a start and end address to each of the respective the start address registers 266*a-d* and the end address register 268*a-d* respectively corresponding to the register sets 254*a-d*. The microcontroller may also write a seed value for the CRC generation to each of the respective initial seed registers 254*a-d*. The microcontroller may trigger the CRC cycle by writing to the trigger register 272. The controller may determine when the CRC generation cycle is complete by polling the status register which may also be referred to as the busy/done register 276. Once the CRC generation cycle is complete, the microcontroller may read the CRC result from the result register 274a-d and compare the CRC results with the expected CRC values determined by CRC calculation module (not shown) implemented in software running on the microcontroller from the expected register values of the respective one of the memory zones 254a-d for which the CRC value has been generated.

By dividing the registers into different memory zones according to how frequently they are accessed or changed, checks on the different memory zones may be performed with different periodicity. For example the dynamic configuration registers 254d may be checked every 5 seconds, whereas the status registers 254c may be checked every second. A single CRC generator 260 can be time multiplexed between the different memory zones 254a-d. Consequently, the size of the CRC generator 260 may be reduced since the maximum number of registers accessed by the CRC generator 260 is reduced. In addition, by having programmable registers for initial seed value 264a-d, start address 266a-d and end address 268a-d, the memory zones for the CRC calculation may be altered during initial configuration and then do not need to be accessed during the application. By having separate result registers, the CRC results for each register set 254a-d may be retained without being overwritten by a subsequent CRC. This may allow the microcontroller to read the results when the system bandwidth becomes available.

Figure 5:
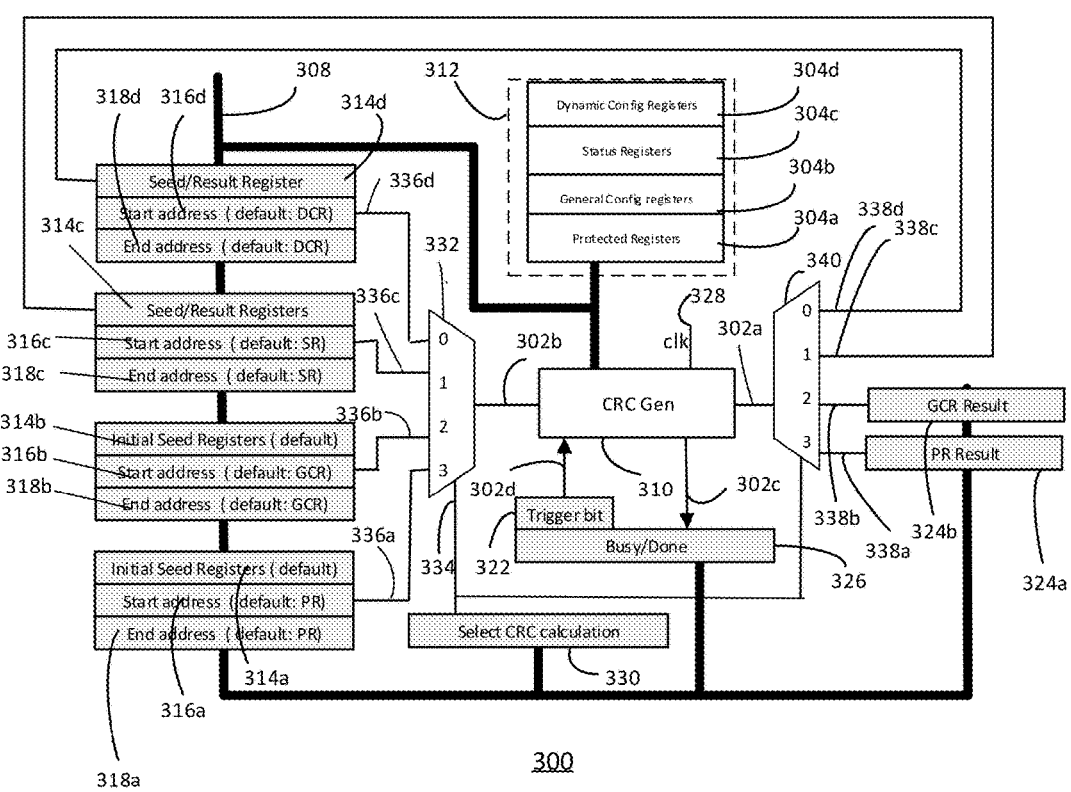
FIG. 5 illustrates a system for error detection according to an embodiment.

FIG. 5 shows a device including a system for register error detection 300. A register bank 312 contains a number of sets of addressable registers 304a, 304b, 304c, and 304d. Each of the groups of registers 304a-d may be connected to a communication bus 308. A CRC generator 310 may be connected to the communication bus 308. Each of the groups of registers 304a-d may have contiguous addresses. Registers are grouped according to how often they are expected to be accessed by an application. A set of general config registers (GCR) 304b may only be accessed (i.e. written to and/or read from) once during an application. A set of dynamic configuration registers (DCR) 304d may be accessed continuously during the application by a microcontroller (not shown) connected to the device 300 by the communication bus 308 in order to perform certain application-related actions. A set of status registers (SR) 304c may be registers that are updated by the device 300 itself based on the operation of other circuitry. For example this may include results from analog-to-digital conversion of a signal received from a brake sensor, radar, airbag sensor. A set of protected registers (PR) 304a may include registers that are not visible to the application. These may for example be factory-only registers that are used for trim or test purposes but not advertised, documented or accessible in normal operation.

The CRC generator 310 may have a result output 302a connected to a result multiplexer 340. The result multiplexer 340 may have four outputs 338a, 338b, 338c, and 338d. The result multiplexer outputs 338a, 338b may be connected to respective result register 324a, 324b. The result multiplexer outputs 338c-338d may be connected to respective seed/result register 314c, 314d. The CRC generator 310 may have a clock input 328.

The CRC generator 310 may have a configuration input 302b connected to an output of an address multiplexer 332. The address multiplexer 332 may have four inputs 336a, 336b, 336c, and 336d. Each of the inputs 336a-b is connected to a respective seed register 314a-b. Each of the inputs 336c-d is connected to a respective seed/result register 314c-d.

Each of the address multiplexer inputs 336a-d is connected to a respective start address register 316a-d and end address register 368a-d.

It will be appreciated that the address multiplexer inputs 336a-d may include multiple wires for separate connections to the respective seed register 314a-b, seed/result register 314c-d, start address register 316a-d and end address register 318a-d. The multiplexer control input may be connected to a control output 334 of a CRC select register 330. The control input of result multiplexer 340 may be connected to a control output 334 of the CRC select register.

The CRC generator 310 may have a status output 302c connected to a status register 326. The status output 302c indicates when the CRC generator is calculating a CRC (busy) or has generated a CRC (done). The CRC generator 310 may have a trigger input 302d connected to a trigger register 322.

The trigger register 322, the status register 326, the initial seed registers 314a-b, the seed/result registers 314c-d the start address register 316a-d, the end address register 318a-d, the result registers 324a-b, and the CRC select register 330 may be connected to the communication bus 308.

In operation of the device 300, the CRC generator 310 may have read access to the registers in the register bank 312. A controller (not shown) connected to the device 300 via the communication bus 308 may have read/write access to the register bank 312 and may for example access registers one or all of the register sets 304a-d to set up various operating modes of the device 300. The controller may also have read/write access to the trigger register 322, the status register 326, the initial seed registers 314a-b, the seed/result registers 314c-d the start address register 316a-d, the end address register 318a-d, the result registers 324a-b, and the CRC select register 330

The controller may keep a local copy of an expected value for the registers in the memory zones 304a-d in a local memory (not shown).

The CRC generator 310 may generate a CRC for each of the register sets 304a-d from the values of the registers in the respective register set. A controller may determine which of the register sets 304a-d is accessed by the CRC generator 310 by control of the multiplexer 332 by writing a value into the selection register 3300. The controller may determine whether of the result registers 324a-b or seed/result register 314c-d are used to store the CRC result by controlling by writing a value into the selection register 330.

The controller may write a start and end address to each of the respective the start address registers 316a-d and the end address register 318a-d respectively corresponding to the register sets 304a-d. The controller may also write a seed value for the CRC generation to each of the respective initial seed registers 304a-c, and the seed/result registers 314c, 314d.

The controller may trigger the CRC cycle for a particular one of the register sets 304a-d by writing to the trigger register 322. The controller may determine when the CRC generation cycle is complete by polling the status register which may also be referred to as the busy/done register 316. Once the CRC generation cycle is complete, the controller may read the CRC result from the result register 324a-b and the seed/result registers 314c, 314d and compare the CRC results with the expected CRC values determined by a CRC calculation module (not shown) from the expected register values of the respective one of the memory zones 304a-d for which the CRC value has been generated. Alternatively or in addition, for memory zones of registers 304c, 304d, the controller may trigger the CRC check repeatedly. The result stored in the respective one of the seed/result registers 314c, 314d may then be used as the seed for the following CRC generation. The cumulative result is then stored back in the respective one of the seed/result registers 314c, 314d The CRC calculation module in the controller may similarly generate a cumulative CRC result by using the expected CRC result as a seed for subsequent CRC calculations. As register sets 304c, 304d may change the values more frequently, this allows multiple CRC generation to be triggered without reading a result each time.

By dividing the registers into different memory zones according to how frequently they are accessed or change, the single CRC generator 310 can be time multiplexed between the different memory zones 304a-d. Consequently, the size of the CRC generator 310 may be reduced since the maximum number of registers accessed by the CRC generator 310 is reduced. In addition, by having programmable registers for seed values 314a-d, start address 316a-d and end address 318a-d, the memory zones for the CRC calculation may be altered during initial configuration and then do not need to be accessed during the application.

Figure 6:
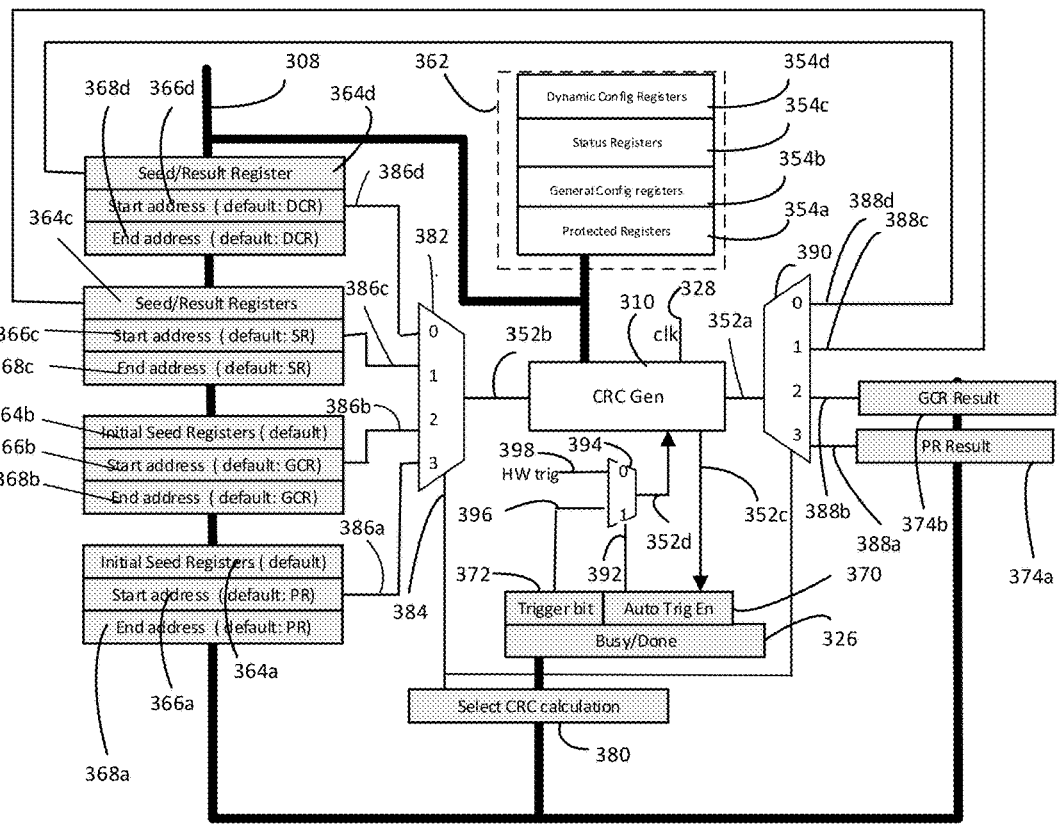
FIG. 6 illustrates a system for error detection according to an embodiment.

FIG. 6 shows a device 350 including system for register error detection 350. A register bank 362 contains a number of sets of addressable registers 354a, 354b, 354c, and 354d. Each of the groups of registers 354a-d may be connected to a communication bus 358. A CRC generator 360 may be connected to the communication bus 358. Each of the groups of registers 354a-d may have contiguous addresses. Registers are grouped according to how often they are expected to be accessed by an application. A set of general configuration registers 354b may only be accessed (i.e. written to and/or read from) once during an application. A set of dynamic configuration registers 304d may be accessed continuously during the application by a controller or microcontroller (not shown) connected to the device 350 by the communication bus 358 in order to perform certain application-related actions. A set of status registers 354c may be registers that are updated by the device 350 itself based on the operation of other circuitry. For example, this may include results from analog-to-digital conversion of a signal received from a brake sensor, radar, airbag sensor. A set of protected registers 304a may include registers that are not visible to the application. These may for example be factory-only registers that are used for trim or test purposes but not advertised, documented or accessible in normal operation.

The CRC generator 360 may have a result output 352a connected to a result multiplexer 390. The result multiplexer 390 may have four outputs 388a, 388b, 388c, and 388d. The result multiplexer outputs 388a, 388b may be connected to respective result register 374a, 374b. The result multiplexer outputs 388c-388d may be connected to respective seed/result register 364c, 364d. The CRC generator 360 may have a clock input 378.

The CRC generator 360 may have a configuration input 352b connected to an output of an address multiplexer 382. The address multiplexer 382 may have four inputs 386a, 386b, 386c, and 386d. Each of the inputs 386a-b is connected to a respective seed register 364a-b. Each of the inputs 386c-d is connected to a respective seed/result register 364c-d.

Each of the address multiplexer inputs 386a-d is connected to a respective start address register 366a-d and end address register 368a-d.

It will be appreciated that the address multiplexer inputs 386a-d may include multiple wires for separate connections to the respective seed register 364a-b, seed/result register 364c-d, start address register 366a-d and end address register 368a-d. The multiplexer control input may be connected to a control output 384 of a CRC select register 380. The control input of result multiplexer 390 may be connected to control output 384 of the CRC select register 380.

The CRC generator 360 may have a status output 352c connected to a status register 376. The status output 352c indicates when the CRC generator is calculating a CRC (busy) or has generated a CRC (done). The CRC generator 360 may have a trigger input 352d connected to an output of trigger multiplexer 394. The trigger multiplexer 394 may have a hardware trigger input 398 and a trigger register input 396 from a trigger register 372. The trigger multiplexer control input 392 may be connected to an auto trigger enable register 370.

The trigger enable register 370, trigger register 372, the status register 376, the initial seed registers 364a-b, the seed/result registers 364c-d the start address register 366a-d, the end address register 368a-d, the result registers 374a-b, and the CRC select register 380 may all be connected to the communication bus 358.

In operation of the device 350, the CRC generator 360 may have read access to the registers in the register bank 362. A controller (not shown) connected to the device 350 via the communication bus 358 may have read/write access to the register bank 362 and may for example access registers one or all of the register sets 354a-d to set up various operating modes of the device 300. The controller may also have read/write access to the trigger enable register 370, the trigger register 372, the status register 376, the initial seed registers 364a-b, the seed/result registers 364c-d the start address register 366a-d, the end address register 368a-d, the result registers 374a-b, and the CRC select register 380.

The controller may keep a local copy of an expected value for the registers in the memory zones 354a-d in a local memory (not shown).

The CRC generator 360 may generate a CRC for each of the register sets 354a-d from the values of the registers in the respective register set. A controller may determine which of the register sets 354a-d is accessed by the CRC generator 360 by control of the multiplexer 382 by writing a value into the selection register 380. The controller may determine whether of the result registers 324a-b or seed/result register 314c-d are used to store the CRC result by controlling by writing a value into the selection register 380.

The controller may write a start and end address to each of the respective the start address registers 366a-d and the end address register 368a-d respectively corresponding to the register sets 354a-d. The controller may also write a seed value for the CRC generation to each of the respective initial seed registers 354a-c, and the seed/result registers 364c, 364d.

The controller may trigger the CRC cycle for a particular one of the register sets 354a-d by writing to the trigger register 372 if the auto trigger is disabled which may be determined by the value of the auto trigger enable register 370. Alternatively if the auto trigger is enabled, the CRC will be triggered by the hardware trigger signal which may be internally generated in the device 350. In some examples, the hardware trigger may be generated periodically by a timer (not shown). In other examples the, the hardware trigger may be an application-specific event. For examples included in a radar system, the event may be a request to generate a new chirp signal, which may modify the register contents so requiring a new CRC calculation. In other examples included in an airbag system, the event may be a post-launch-airbag event, which may require a verification of the registers and flags to make sure they have been set correctly.

The controller may determine when the CRC generation cycle is complete by polling the status register which may also be referred to as the busy/done register 366. Once the CRC generation cycle is complete, the controller may read the CRC result from the result register 374a-b and the seed/result registers 364c, 364d. The controller may compare the CRC results with the expected CRC values determined by CRC calculation module (not shown). The CRC calculation module may be implemented in software running on the controller. The expected CRC value may be determined from the expected register values of the respective one of the memory zones 354a-d for which the CRC result has been generated.

Alternatively or in addition, for memory zones of registers 354c, 354d, the controller may trigger the CRC check repeatedly. The result stored in the respective one of the seed/result registers 364c, 364d may then be used as the seed for the following CRC generation. The cumulative result may then be stored back in the respective one of the seed/result registers 354c, 354d. The CRC calculation module in the controller may similarly generate a cumulative CRC result by using the expected CRC result as a seed for subsequent CRC calculations. As register sets 354c, 354d may change the values more frequently, this allows multiple CRC generation to be triggered without reading a result each time. In some systems the time between trigger events may be too short to enable the read-back of a calculated CRC for each event.

By dividing the registers into different memory zones according to how frequently they are accessed or change, the single CRC generator 360 can be time multiplexed between the different memory zones 354a-d. Consequently, the size of the CRC generator 360 may be reduced since the maximum number of registers accessed by the CRC generator 360 is reduced. In addition, by having programmable registers for seed values 364a-d, start address 366a-d and end address 368a-d, the memory zones for the CRC calculation may be altered during initial configuration and then do not need to be accessed during the application.

Figure 7:
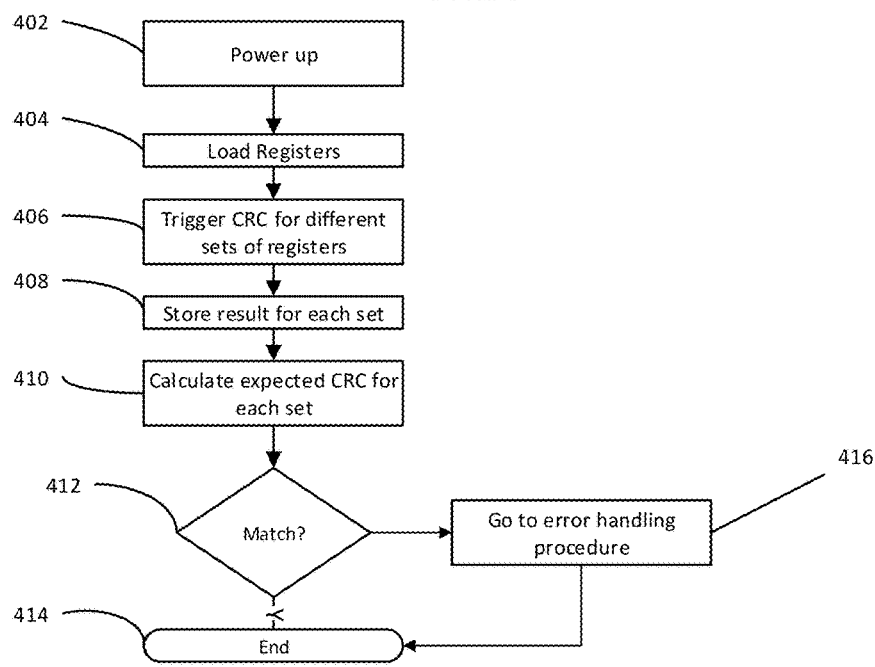
FIG. 7 shows a method of error detection in a system according to an embodiment.

FIG. 7 shows a method for detection of errors in addressable registers 400. In step 402 a device may be powered up. Following initial power up, in step 404 the sets of addressable registers may be loaded with initial values. Each set of the sets of registers are memory-mapped in contiguous addresses. Each of the registers in a particular the register set are grouped together dependent on how often they are likely to change during operation. In step 406 a CRC check is triggered for each of the different sets of registers. In step 408 a CRC result is stored for each register set. Prior to comparison, an expected CRC result is calculated for each set in step 410 based on the expected register values. In step 412 a comparison may be made between the expected and generated CRC values. If the expected and generated CRC values match, the procedure may finish in step 414. In alternative examples, the method may return to step 406 and repeat the CRC generation for new register values. Returning to step 412, if the CRC values do not match than the method 400 moves to an error handling procedure in step 416. Following completion of the error handling procedure, the method finishes at step 414.

Figure 8:
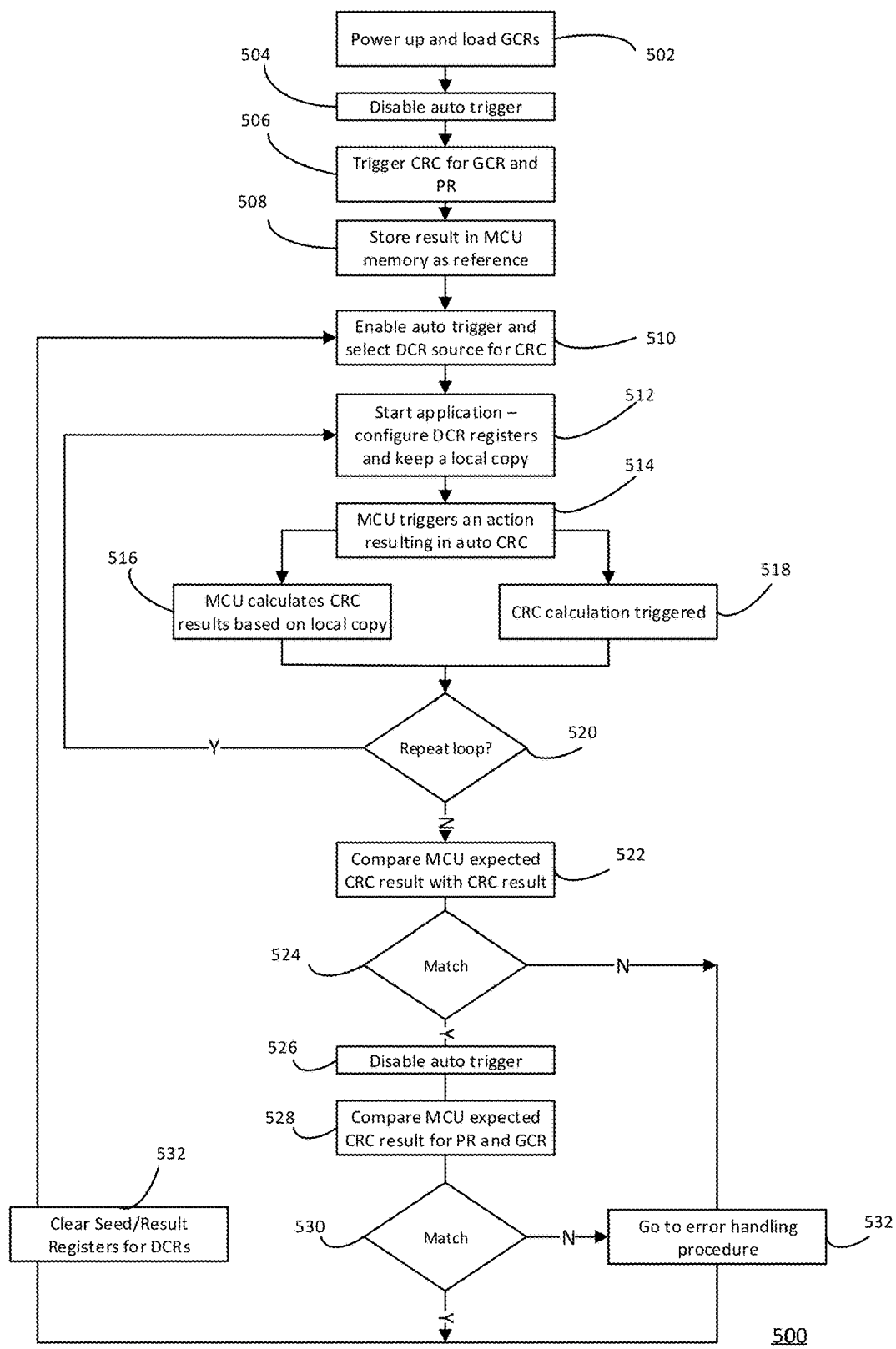
FIG. 8 shows a method of error detection in a system according to an embodiment.

FIG. 8 shows a method of register error detection 500 which may be used for example for error detection in a system including the ASIC device 350 connected to an MCU. In step 502, at power-up, the ASIC's general configuration registers 354b including those related to all CRC calculations may be loaded with initial values. In step 504 an auto trigger may be disabled for example by writing to the auto trigger enable register 370. In step 506 the CRC may be triggered for the general configuration registers 354b and the protected registers 354a by writing to the trigger register 372. A copy of the register values may then be stored by the MCU in its own memory as reference in step 508. In step 510, the application starts and the MCU may configure the ASIC's DCRs 354d for a given action. The MCU may keep a copy of these register values in its own internal memory. The MCU may enable the auto trigger by writing to the auto trigger enable register 370 and also select the DCR registers 354d as source for the CRC by writing to the select CRC register 380. In step 514 when demanded by the application, the MCU may trigger an action in the ASIC 350 that in turn automatically triggers a DCR CRC calculation in step 518. The result may be stored in the dedicated DCR seed/result register 364d within the ASIC 350. In parallel, in step 516 the MCU may perform a CRC calculation on the local DCR value copy, and the result may also be stored as the seed for the next cycle.

Following completion of step 516 and 518, the method 500 may determine whether or not to repeat the loop in step 520. This determining may be for example comparing the current loop number with a predetermined maximum loop number depending on the application behaviour and the Fault-Tolerant Time Interval (FTTI). If the loop is repeated then the method returns to step 512. Otherwise before the FTTI, in step 522 the MCU may request the DCR's seed/result. In step 524 a comparison may be made by the MCU with its local copy. If they both match, no soft error is assumed. Otherwise, a soft-error has occurred and it must be handled accordingly in error handling procedure 532. If no soft error has occurred then in step 526, the MCU may disable the auto trigger and request both PR and GCR CRC conversions in step 526 by writing to the trigger register 372 and selecting the PR and GCR regions to be checked by writing appropriate control values to the CRC select register 380.

In step 528, the results of the PR and GCR conversion may be read back and compared in step 530 against their respective baselines. If there is a match then, in step 532 the MCU may clear the seed/result registers for DCR registers 354d, and loop back to step 510. If there is an error then the error handling procedure is started in step 532. Following completion of the error handling procedure 532, the method moves to step 532 to clear the seed/result registers for DCR registers 354d.

A system for register error detection is described, the system comprising: a plurality of addressable registers comprising sets of registers, the registers in each set having contiguous addresses; a cyclic redundancy check generator coupled to the addressable registers and configured to determine a cyclic-redundancy-check result for each set of registers from the values of each of the respective set of registers; a controller coupled to the registers and the cyclic-redundancy-check generator. The controller comprises a cyclic-redundancy-check calculator and is configured to determine an expected cyclic-redundancy-check result from expected values for each of the set of registers, to read the cyclic-redundancy-check result for each of the set of registers determined by the cyclic-redundancy-check generator, and to compare the generated cyclic-redundancy-check result with the calculated cyclic-redundancy-check result and wherein a difference between the generated cyclic-redundancy-check result and the calculated cyclic-redundancy-check result is indicative of an error condition.

Examples described herein may be included in systems, in particular automotive control systems including a controller such as an MCU connected to a number of ASICs. These ASICs may include for example radar front-end device where the main "application cycle" consists in transmitting (and receiving) a modulated ramp. Other examples include airbag and braking ASICs which have a high analog circuit content and are driven by an independent microcontroller. In some examples the seed and/or result registers may themselves be included in one of the register sets and consequently the values in these registers will also contribute to the CRC result.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A system for register error detection comprising:
   a plurality of addressable registers comprising sets of registers, the registers in each set having contiguous addresses;
   a cyclic-redundancy-check generator coupled to the addressable registers and configured to determine a cyclic-redundancy-check result for each set of registers from the values of each of the respective set of registers;
   a controller coupled to the registers and the cyclic-redundancy-check generator;
   wherein the controller comprises a cyclic-redundancy-check calculator and is configured to determine an expected cyclic-redundancy-check result from expected values for each of the set of registers, to read the cyclic-redundancy-check result for each of the set of registers determined by the cyclic-redundancy-check generator, and to compare the generated cyclic-redundancy-check result with the calculated cyclic-redundancy-check result and wherein a difference between the generated cyclic-redundancy-check result and the calculated cyclic-redundancy-check result is indicative of an error condition.

2. The system of claim 1 comprising a first device and a second device, wherein the first device comprises the plurality of addressable registers and the cyclic-redundancy-check generator and the second device comprises the controller.

3. The system of claim 2 wherein the second device comprises a microcontroller.

4. The system of claim 2 wherein the first device comprises one of a radar front-end device, an airbag control device and a vehicle braking system control device.

5. The system of claim 2 wherein the cyclic-redundancy-check generation for at least one of the register sets is triggered by further circuitry in the second device.

6. The system of claim 1 wherein the cyclic-redundancy-check generator is further configured to use the cyclic-redundancy-check result as a seed value for a subsequent cyclic-redundancy-check generation, the cyclic-redundancy-check calculator is configured to use the calculated cyclic-redundancy-check result as a seed value for a subsequent further cyclic-redundancy-check calculation and wherein the cyclic-redundancy-check generator and the cyclic-redundancy-check calculator are configured to generate a cumulative generated cyclic-redundancy-check result and a cumulative calculated cyclic-redundancy-check result and wherein a difference between the cumulative generated cyclic-redundancy-check result and the cumulative calculated cyclic-redundancy-check result is indicative of an error condition.

7. The system of claim 1 wherein the sets of registers comprises a set of registers which store values determined by the controller during operation.

8. The system of claim 1 wherein the sets of registers comprises at least one set of registers which store values determined by a further circuit.

9. The system of claim 1 wherein the sets of registers comprises a set of registers which each store a constant value following an initialization phase.

10. The system of claim 1 wherein the sets of registers comprises a set of configuration registers, a set of dynamic control registers, a set of status registers, and a set of protected registers.

11. A method for register error detection in a system comprising sets of memory-mapped registers, each set having contiguous addresses, the method comprising generating a cyclic redundancy check, cyclic-redundancy-check, result for each set of registers from the register values, comparing the generated cyclic-redundancy-check result with a calculated cyclic-redundancy-check result from the expected register values and wherein a difference between the generated cyclic-redundancy-check result and the calculated cyclic-redundancy-check result is indicative of an error condition.

12. The method of claim 11 wherein determining the cyclic-redundancy-check result is determined in a first device comprising a first cyclic-redundancy-check calculator and the plurality of addressable registers and determining the second cyclic-redundancy-check result is determined in a second device comprising a second cyclic-redundancy-check calculator, wherein the second device determines at least some of the register values of the plurality of addressable registers.

13. The method of claim 11 further comprising generating a cumulative generated cyclic-redundancy-check result using the generated cyclic-redundancy-check result as a seed for a subsequent cyclic-redundancy-check generation, generating a cumulative calculated cyclic-redundancy-check result using the calculated cyclic-redundancy-check result as a seed for a subsequent cyclic-redundancy-check calculation, comparing the cumulative generated cyclic-redundancy-check result and the cumulative calculated cyclic-redundancy-check result, and wherein a difference between the cumulative cyclic-redundancy-check result and the expected cumulative cyclic-redundancy-check result is indicative of an error condition.

14. The method of claim 11 wherein the cyclic-redundancy-check generation for at least one of the register set is hardware-triggered.

15. The method of claim 11 wherein the sets of registers comprise at least one of a set of registers whose values remain constant following an initialization phase and a set of registers whose values change during operation.

* * * * *